United States Patent
Rullman

[15] 3,702,583
[45] Nov. 14, 1972

[54] APPARATUS FOR PROCESSING FOOD

[72] Inventor: George B. Rullman, 738 East 7th St., Hastings, Nebr. 68901

[22] Filed: April 6, 1970

[21] Appl. No.: 25,693

Related U.S. Application Data

[63] Continuation-in-part of Ser. No. 831,487, June 9, 1969, Pat. No. 3,505,072.

[52] U.S. Cl. ..................99/335, 99/357, 99/407, 99/443 C, 221/69, 222/143
[51] Int. Cl. ............................................A47j 37/00
[58] Field of Search.....99/1, 335, 334, 336, 325, 443 C, 99/407, 404, 355, 427, 357; 221/69; 222/143

[56] References Cited

UNITED STATES PATENTS

| | | |
|---|---|---|
| 2,501,712 | 3/1950 | Chodziesner................99/357 |
| 3,525,298 | 8/1970 | Nicolaus......................99/334 |
| 3,384,071 | 5/1968 | Body et al. ............99/325 UX |
| 3,347,152 | 10/1967 | Congelli et al...............99/334 |
| 2,532,894 | 12/1950 | Currier....................99/335 X |
| 3,274,920 | 9/1966 | Benson...................99/407 X |
| 3,448,677 | 6/1969 | Dexters......................99/336 |
| 2,965,015 | 12/1960 | Huchok ................99/335 UX |
| 3,237,804 | 3/1966 | Bardy et al............99/407 UX |
| 3,233,536 | 2/1966 | Ignelzi........................99/357 |

Primary Examiner—Billy J. Wilhite

[57] ABSTRACT

A method and apparatus for controlling the processing of food in a processing environment includes the utilization of a time setting apparatus that may be remotely located from the processing environment.

One embodiment utilizes a push button operated control mechanism that automatically locates the food in the processing environment for a preselected time interval.

A second embodiment includes the use of a key punch apparatus which will produce a tape means for controlling the processing time of the food and at the same time provides a permanent record of the number of servings and types of food that was processed over a time interval.

A third embodiment utilizes a plurality of holders which store food of a preselected type and quantity. Circuitry is provided to control the automatic dispensing of selected food into a carrier with a hinged bottom and also the removal of the food therefrom either before or after it has gone through a cooking environment.

The above-mentioned embodiments are particularly usable in vending machines and other types of food processing apparatus.

7 Claims, 19 Drawing Figures

INVENTOR.
George B. Rullman

INVENTOR.
George B. Rullman

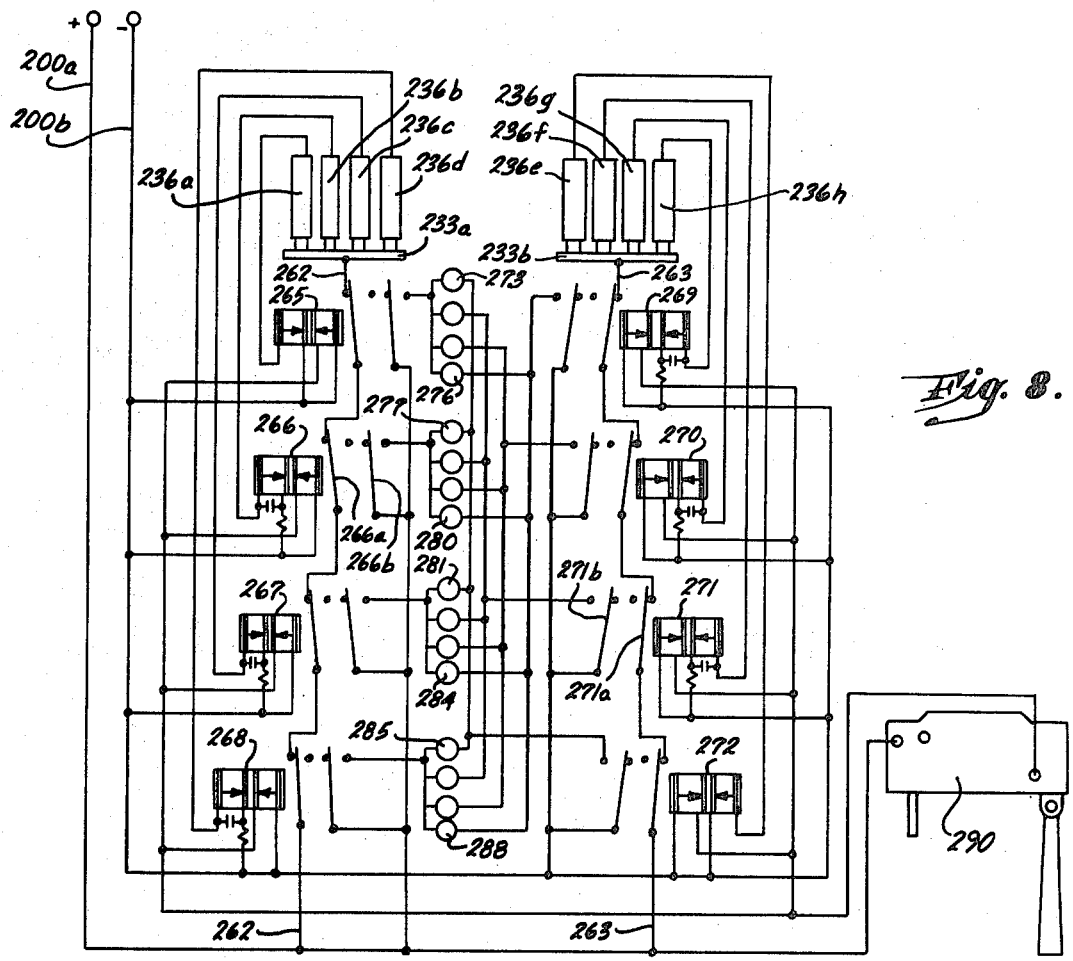
Fig. 8.
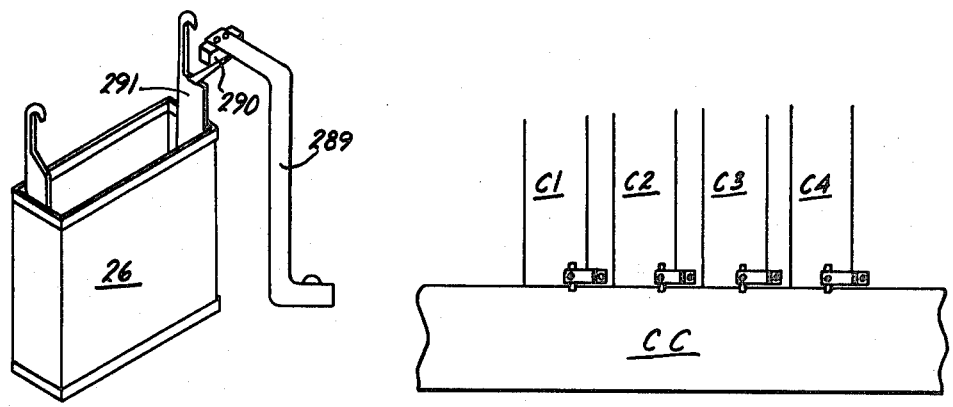
Fig. 9.
Fig. 10.
INVENTOR.
George B. Rullman

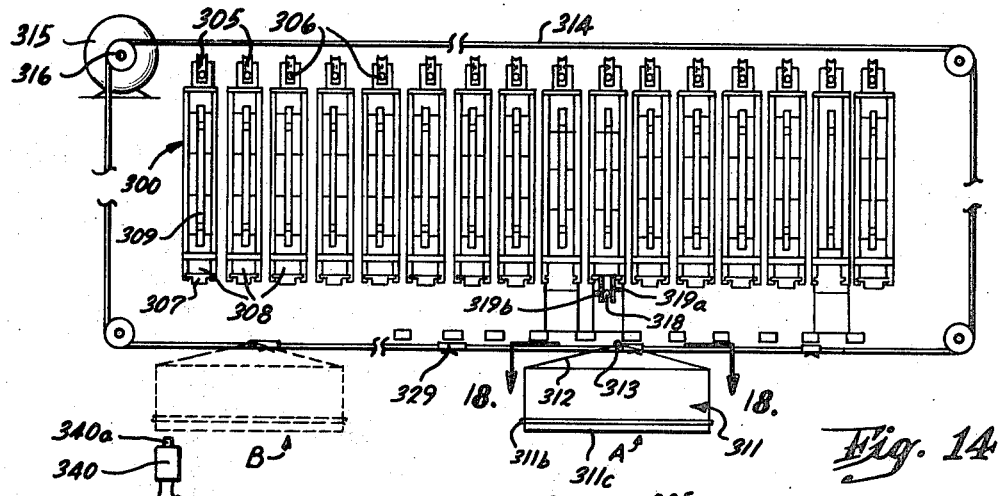
Fig. 14.
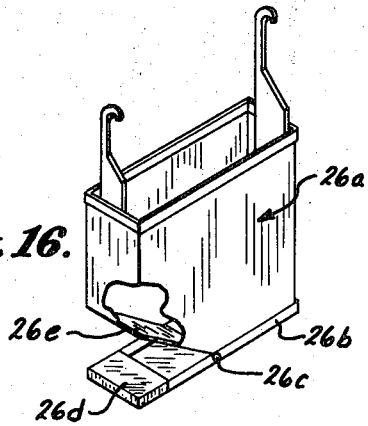
Fig. 16.
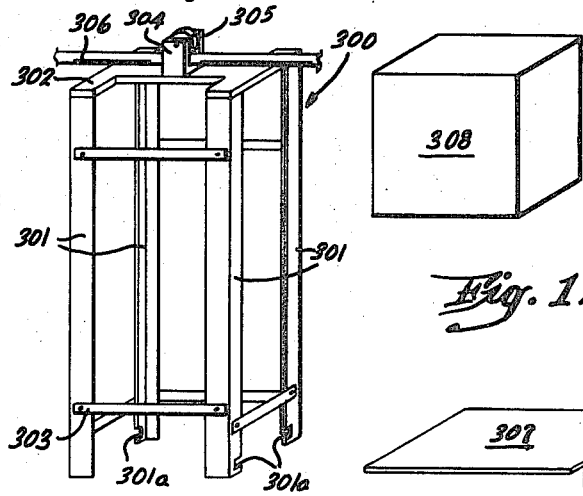
Fig. 11.      Fig. 12.
Fig. 13.
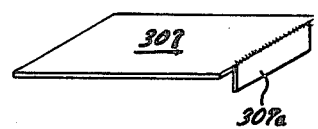
Fig. 18.
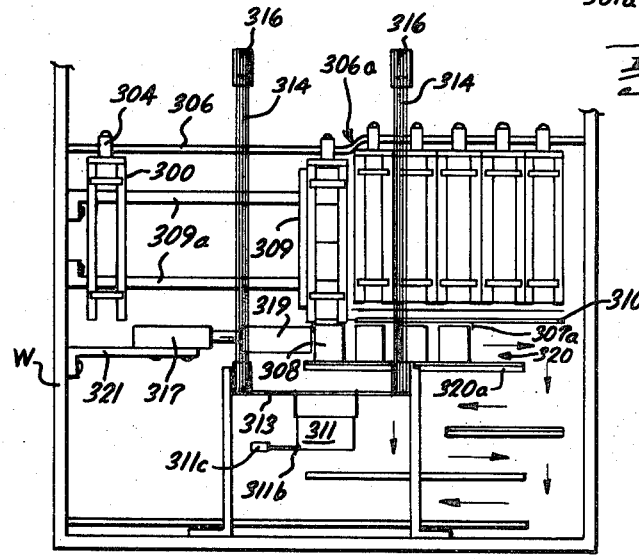
Fig. 15.
INVENTOR.
George B. Rullman
BY
ATTORNEYS

APPARATUS FOR PROCESSING FOOD

This is a continuation-in-part of my patent application titled "METHOD AND APPARATUS FOR OPERATING A SINGLE LINE CONVEYOR," Ser. No. 831,487, filed June 9, 1969 now U.S. Pat. No. 3,505,072 which was issued Apr. 7, 1970.

BACKGROUND AND BRIEF DESCRIPTION OF THE INVENTION

The above-mentioned patent fully discusses a method and apparatus for utilization of a single line conveyor and a timing device which operates to remember the processing time for each individual carrier that is moved into the processing environment and which remembers the conditions in the processing environment for optimum utilization thereof. This timing device made use of a time setting program device which was located on each carrier so that the timing device would be automatically set by the movement of the carrier.

My invention relates to apparatus for controlling the processing of food in a cooking environment and includes a remotely located time setting apparatus. It is contemplated that a conveyor line similar to that shown in my above-mentioned patent application could be incorporated with the subject remote time setting apparatus so that an operator could control the cooking of the food by a means other than the time setting program device located on each food carrier. In this regard, a push button operated control mechanism operates to electrically set the time on a timing unit (of a similar design to that which has been disclosed in my above-mentioned patent application) by means of a reversible motor.

Another embodiment contemplates the eliminating of portions of the timing mechanism and the utilization of a key punch apparatus which produces punched tape which will interpret time selections, quantity and different types of food for cooking. Concurrently, a detailed permanent record (the punched tape) of the above parameters is produced and made available to management for bookkeeping and accounting functions. It is also contemplated that punched cards and an appropriate card sorter could be used to perform the interpretation function as well as punched tape.

A further embodiment includes the utilization of roller mounted holders which store a number of opened-bottom fold containers on top of each other so that the top of one container serves as the bottom of the one immediately above. Circuitry is provided to control the automatic dispensing of selected food into a carrier with a hinged bottom and the further removal of the food therefrom either before or after it has gone through a cooking environment.

It is a feature of the embodiments that they may be utilized in the vending machine apparatus or fast order restaurants where a user is permitted to select from a plurality of different types of frozen food (or other prepared foods) and to have same cooked in either cooking oils, microwave ovens or similar environments. Since the control of the food carrier is performed at a location remote from the cooking environment, prepackaged fresh or frozen means and/or food items may be delivered on a conveyor or other suitable means to cooking environment upon the manipulation of the appropriate controls. Once the particular food and/or meal has been selected and a recommended cooking time programmed for same, the combined unit will operate to process the food in a vending machine type apparatus (or restaurant) and then dispense same in a fully prepared condition after having made optimum use of the cooking environment.

An object of my invention is to provide a unique apparatus for controlling the processing of food. It is a feature of my invention that the apparatus may be incorporated into a vending machine thereby permitting the user of same to select from a plurality of different types of food and processing periods and to receive an optimally processed food product in a short period of time.

Another object of my invention is to provide a unique apparatus for processing food products for preselected time periods that is foolproof and may be performed by an unskilled operator.

A further object of my invention is to provide a unique apparatus for processing food products which permits the mechanism controlling the processing parameters to be at a remote location from the food product processing environment.

A still further object of my invention is to provide a uniquely constructed apparatus that permits the ordering of food and cooking preparation to be done automatically.

Another object of my invention is to provide a uniquely constructed apparatus that permits the food about to be processed to be stored in a sanitary, germ free environment and which does not require handling by attendant personnel during the cooking and dispensing of a processed food item.

Another object of my invention is to provide a uniquely constructed apparatus for processing food and to remotely control the selection of food items and the associated processing time while simultaneously preparing a permanent detailed record of the number of servings, the cooking times, and the food items selected for a given time period.

Another object of my invention is to provide a uniquely constructed apparatus that permits the remote selection of both food items and processing time for food in a vending machine apparatus and to automatically receive the processed food at the end of the selected time period.

Another object of my invention is to provide a uniquely constructed key punch for use with a cooking device. It is a function of my invention that the key punch produces a tape output that will control at a remote location, the processing of food and at the same time produce a permanent record of food items, quantities and selected processing time periods.

Another object of my invention is to provide a unique apparatus for processing food which may be controlled from a remote location and which utilizes a plurality of conveyors thereby permitting the selection of a plurality of different processing types of food products, varying portions, and different processing time periods for same. It is a feature of all the objects that optimal use is made of the cooking environment during utilization of the device.

Another object of my invention is to provide a unique holder structure for storing food of selected types and quantities prior to automatically dispensing same into a food carrier structure.

A further object of my invention is to provide a uniquely constructed food carrier for movably supporting food and dispensing same therefrom either before or after the food has been processed by a cooking environment. It is a feature of my invention that the carrier has a hinged bottom which may be automatically opened for dispensing purposes.

Another object of my invention is to provide a unique circuit for controlling the utilization of the holder structure and the hinged bottom carrier.

Another object of my invention is to provide a holder structure of the character described which stores a plurality of opened-bottom food containers therein in such a manner that the top of a lower container serves as the bottom of the holder immediately above within the bolder structure.

A further object of my invention is to provide a unique apparatus for controlling the selection of different types and quantities of food and automatically dispensing the selected food into a carrier means for moving same into a cooking environment.

Another object of my invention is to provide a unique combination of food holders and control means for automatically selecting different types and quantities of food from a remote location and controlling the movement of same into and out of a food cooking environment.

Other and further objects of the invention, together with the features of novelty appurtenant thereto, will appear in therewith, course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 8 is a schematic circuit diagram for controlling the movement of carriers onto an incoming conveyor in accordance with the type of food and the number of servings selected on the key punch unit;

FIG. 9 is a perspective view of a carrier, an associated microswitch and bracket which may be utilized with the circuitry disclosed in FIG. 7;

FIG. 10 is a top plan view of a plurality of conveyors which store and move carriers to the incoming conveyor in accordance with the food and the number of servings selected on the key punch unit;

FIG. 11 is a perspective view of the roller mounted holder with a portion of the rod mount shown therein;

FIG. 12 is a perspective view of a food container usable with the holder structure;

FIG. 13 is a perspective view of the plate which holds the container within said holder;

FIG. 14 is an end elevational view of the plurality of holders. The carrier, carrier conveyor, and associated motor are also shown in schematic form;

FIG. 15 is a side elevational view of the view in FIG. 14 showing the carrier in position to receive the food contents from the container;

FIG. 16 is a perspective view of a modified carrier which receives food at position B;

Figure 7:
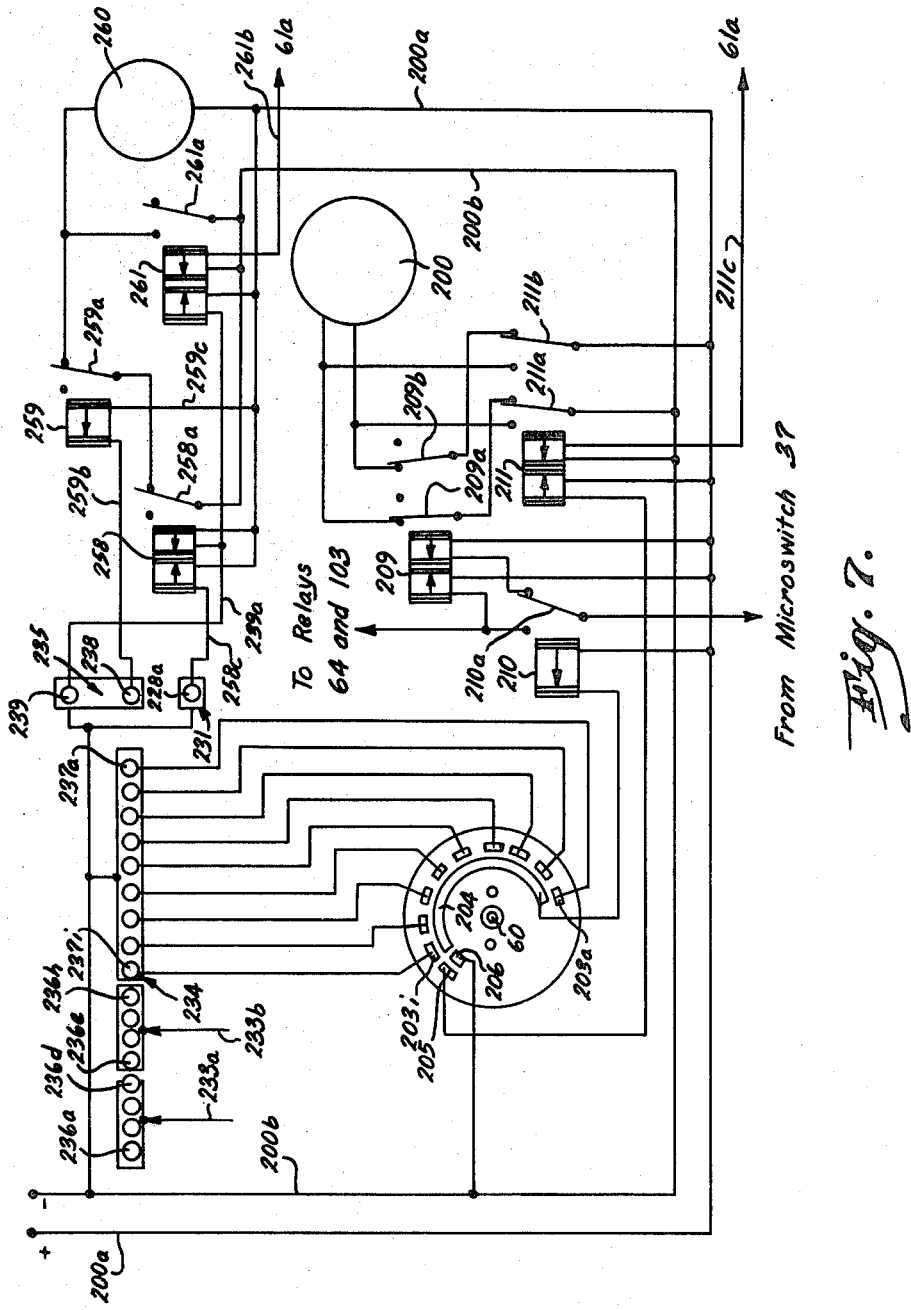
FIG. 7 is a schematic diagram showing a means for rotating the time setting wheel to conform with the exposure time of the food carriers, said rotating being accomplished from a punched tape. Also circuitry monitoring the movement of the tape from the second position Q of the key punch unit is disclosed therein.
Figures 17, 19:
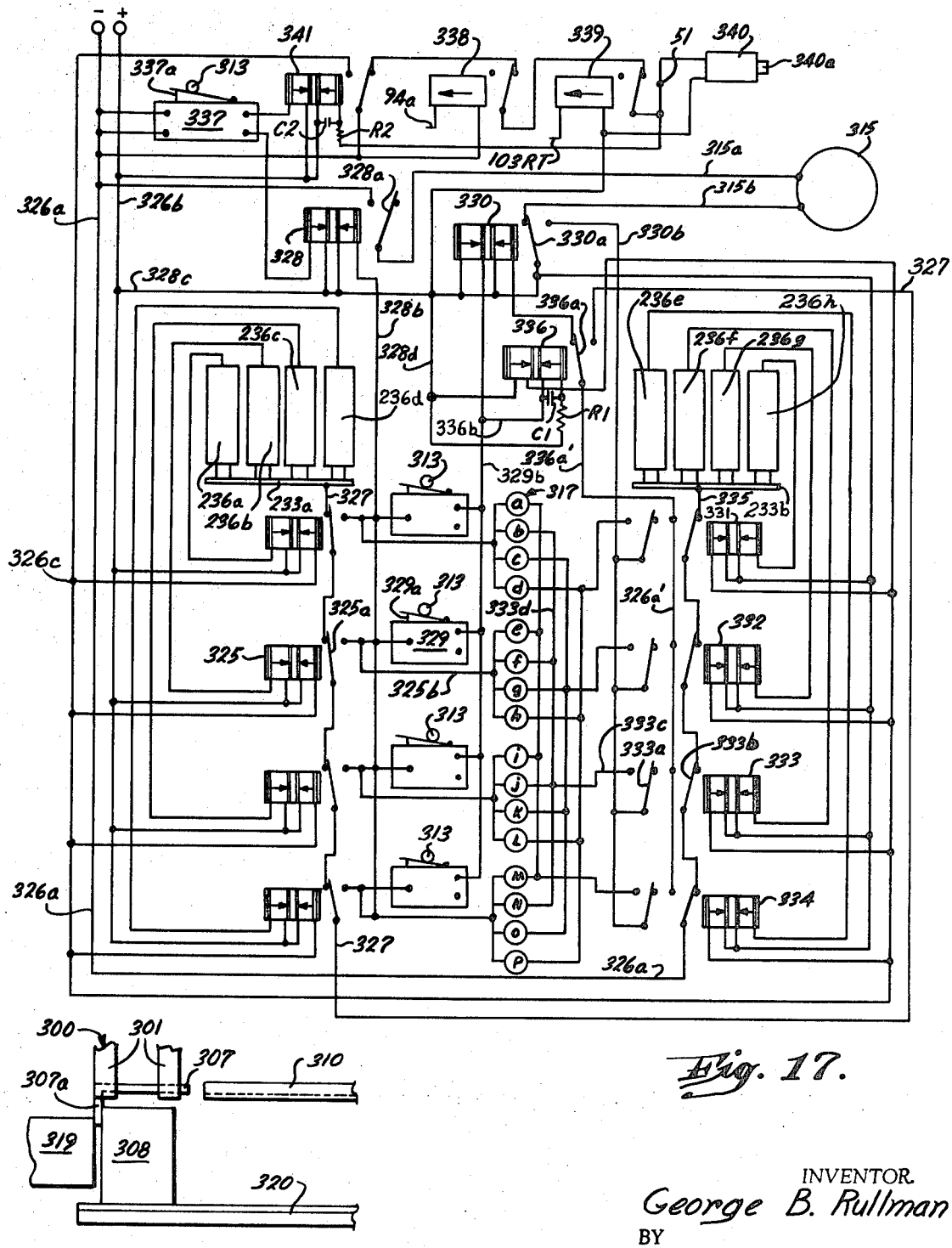

FIG. 17 is a schematic circuit diagram showing the elements for controlling the components of FIGS. 14 and 15 and which is usable with FIG. 7 and 17a and 17b of my copending application;

FIG. 18 is a top elevational view of the carrier conveyor and carrier rod taken generally along the line 18—18 in the direction of the arrows; and FIG. 19 is an enlarged partial side elevational view of a forward portion of the pusher head in contact with the forward surface of the lip on the holder plate.

Turning now more particularly to the figures, the operation of the timer mechanism as associated with FIG. 9 in my above-mentioned copending patent application was thoroughly discussed beginning at page 9. It is indicated therein that same was to be positioned and activated by the movement of the carriers along the single line conveyor. Furthermore, the raising of a time setting arm 34 initiated the operation of several associated mechanisms. The subject invention to be discussed herein includes a different method and apparatus for selecting food, the number of servings to be processed in the processing environment and the time for cooking, however is also utilizes certain control functions of the previously disclosed apparatus for accomplishing the above-mentioned purposes.

Figure 1:
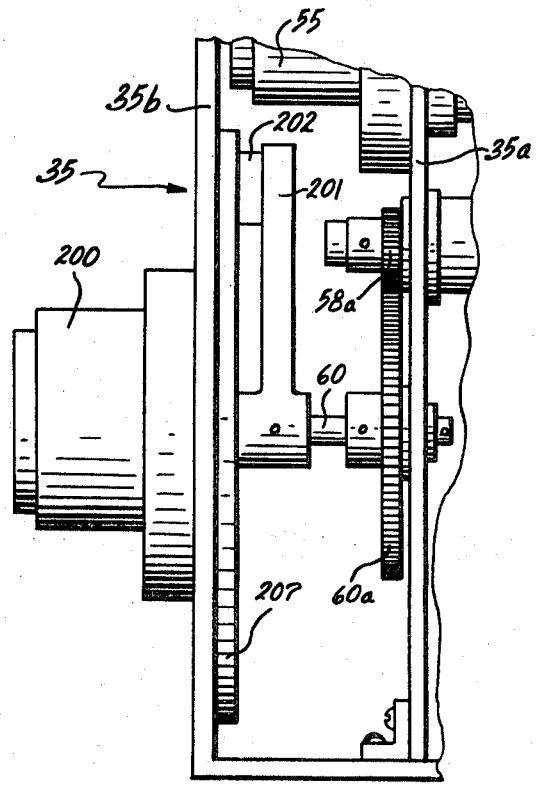
FIG. 1 is a partial side elevational view of the inside of the timer unit disclosed in my copending patent application (and similar to FIG. 9 thereof) and showing the addition of a motor, a disc containing commutator contacts, and a lever arm operable to rotate electrical contact brushes parallel to the commutator contacts.

As shown in FIG. 1 (which corresponds to the lower left-hand portion of FIG. 9 in my copending patent application), the device for setting a selected time on time setting wheel 53 (disclosed in my previous application) includes the rotating of shaft 60 by a gear reduction reversible motor 200 which is adaptable to be mounted on the exterior of wall 35b of the timer unit 35. The motor initiated movement of shaft 60 to a preselected position in a manner which will be discussed in more detail, infra. A lever arm 201 is journalled onto shaft 60 in a conventional manner so that same is rotatable therewith. The outer end portion of lever arm 201 has an electrical brush contact 202 fixedly attached thereto.

A generally flattened disc shaped plastic electric contact holder 207 which is appropriately apertured at the center thereof to accommodate shaft 60 extending therethrough and is bolted or otherwise affixed to the inside face of wall 35b of the timer unit 35. The inside of the contact holder 207 is shown in elevation in FIG. 2 (except for lever arm 201) and includes a plurality of electrical contacts hereinafter identified by the numbers 203a through 203i which are embedded in the plastic disc 207 and positioned opposite the arcuate path of brush contact 202. Additionally, an arcuate contact band 204 is located in spaced relationship to the individual contacts 203a–203i as are the final two individual electrical contacts 205 and 206.

As suggested above, the movement of shaft 60 rotates lever arm 201 and will cause the brush contact 202 to span either the individual electrical contacts 203a–203i and the arcuate contact 204 or to span the two individual contact 205 and 206 for purposes which will be discussed in more detail later. It should be pointed out, however, that the circuitry discussed immediately above assists in the elimination of the programming plate 27 (and timer knob) from the carrier 26 and the associated contacting and moving of the lever arm 34 in the manner which was described in detail in my copending patent application.

The subject invention relates to a means for initiating the remote rotation of the time setting wheel to a designated exposure time. Motor 200 is energizable to appropriately rotate the lever arm 201 in accordance with the circuitry shown in FIG. 2 to assist in the energizing of the spaced apart contacts 203a–203i and the contact 204. This energization and control of the movement of motor 200 is accomplished, in part, by the plurality of switches hereinafter identified by the numerals 208a through 208i which accordingly correspond to a respective one of the electrical contacts 203a–203i. (Note the line connections between the switches and the contacts in FIG. 2.) It should be pointed out that the switches 208a–208i may be of the push button variety which are mechanically linked to permit only one to be closed at a time or any other conveniently designed switch and may be located away from the cooking environment and/or the timing mechanism.

When any one of the switches of the series 208a–208i is closed, an incoming carrier may be programmed for a particular exposure time. In this regard, the positioning of the brush contact 202 spans the space between the arcuate electrical contact 204 to permit current flow to a selected one of the individual contacts 203a–203i with an appropriate one of the 208 switches being closed.

Figure 2:
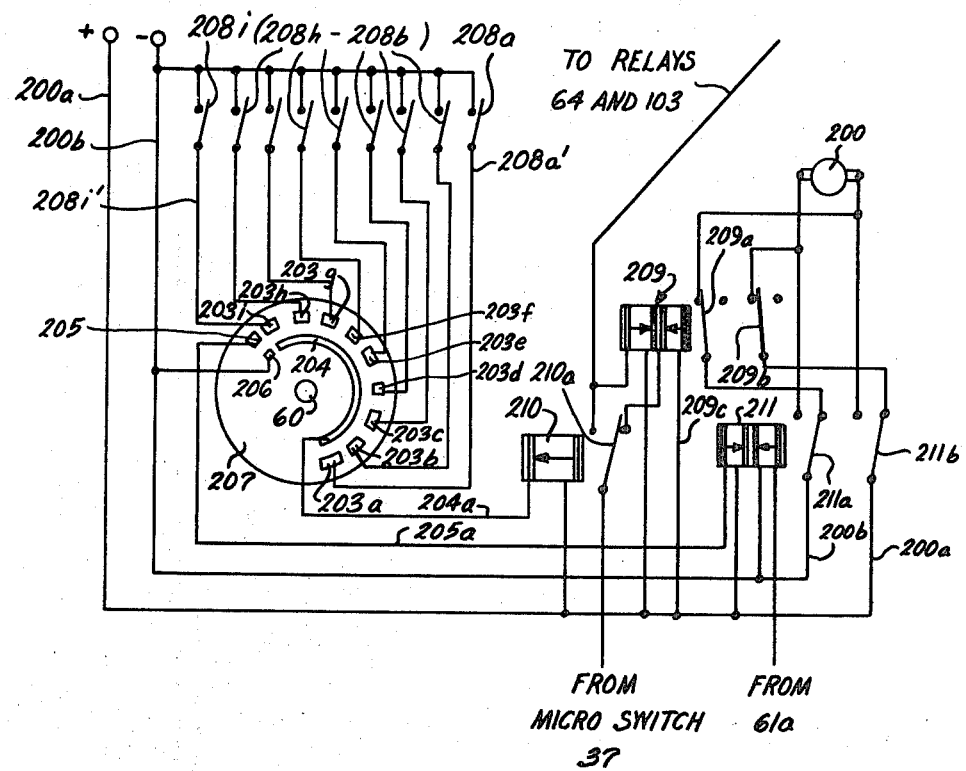
FIG. 2 is a schematic circuit diagram of the first embodiment including a means for rotating the time setting wheel to conform to the preset exposure time for the food carriers, it being significant to note that the FIG. 2 schematic is designed to operatively interconnect with portions of the circuit shown in FIGS. 17a and 17b of my copending patent application.

As disclosed in my U.S. Pat. No. 3,505,072, the movement of a carrier 26 to the position B results in the closing microswitch 37 (note the input line from nicroswitch 37 and the contemplated relocation of same to be closed by the presence of carrier 26 in position B) microswitch energizing the right-hand coil of a double pole double throw latching relay identified by the number 209 via lines 200a, 209c, relay 209, armature 210a and microswitch 37. The energization of the right coil of relay 209 maintains its associated armatures 209a and 209b in contact with the left terminals thereof so that motor 200 will be connected across the voltage source identified by the lines 200a and 200b and armatures 211a, 211b, 209a and 209b. This connection causes the motor to rotate in a clockwise direction (as seen in FIG. 2) and will move the lever arm 201 across the face of disc 207 until brush contact 202 reaches one of the contacts 203a–203i that corresponds to a depressed push button (208a–208i). Assuming push button switch 208a is closed when brush contact 202 is located at contact 203a on disc 207, current will flow from line 200a to the coil of the single pole single throw normally opened reed switch 210, line 204a, contacts 204, 202, 203a, and switch 208a to line 200b. This results in the moving of armature 210a to its left contact thereby switching the potential from microswitch 37 to the left coil of relay 209. This, of course, results in the moving of the armatures 209a and 209b to its right contact and in the corresponding stopping of motor 200. Also, the movement of armature 210a results in the energization of relays 64 and 103 in a manner similar to that discussed in may copending patent application relative to the FIGS. 17a and 17b.

The above-mentioned circuitry in FIGS. 17a and 17b monitors the timing in the space availability of the incoming carrier and energizes the line 61a shown as entering FIG. 2 in the lower right-hand portion. This results in the energization of the right coil of the double pole double throw latching relay 211 which moves its associated armatures 211a and 211b to the left-hand contacts thereof and energizes the motor 200 in an "across the line" (200a and 200b) fashion but in a reverse direction from that previously described thereby causing the lever arm 201 to rotate back until brush 202 spans the contacts 205 and 206. Accordingly, the left coil of the double pole double throw latching relay 211 is energizing line 200a, 205a contacts 205, 202, and 206 to line 200b. This moves the armatures 211a and 211b to the position shown in FIG. 2 thereby stopping the reverse rotation of motor 200. The apparatus in the circuitry is now ready for the entry of the next carrier. As is now seen, a closed switch of the 208a–208i series will continue the same exposure time unless changed.

It should be pointed out that the above-described circuitry and push button-contact arrangement permits a push button console to be remotely located from the processing environment. As a result, it is contemplated that the processing environment could be located within a vending machine (or inside a drive-in restaurant) having the plurality of push buttons conveniently located on the front thereof so that any number of single line conveyor systems could be utilized to transport different types of food into the cooking environment and that the time for cooking certain items be controlled by selective activation of any one of the push buttons. In this manner, the processing environment could optimally accommodate and remember a number of orders so that a vending machine could discharge the finished product while making optimal use of the cooking environment (vat space or microwave oven).

Key Punch and Tape Control Mechanism

The second embodiment of my invention includes a method and apparatus for accumulating orders by punching holes in tape which will correspond to exposure processing time, the type of foods selected, and the number of servings of each order that is prepared. This tape is then delivered to a readout area which interprets the above parameters including the time selected so that the proper contacts 203a–203i are ready for control of the cooking time.

Figure 3:
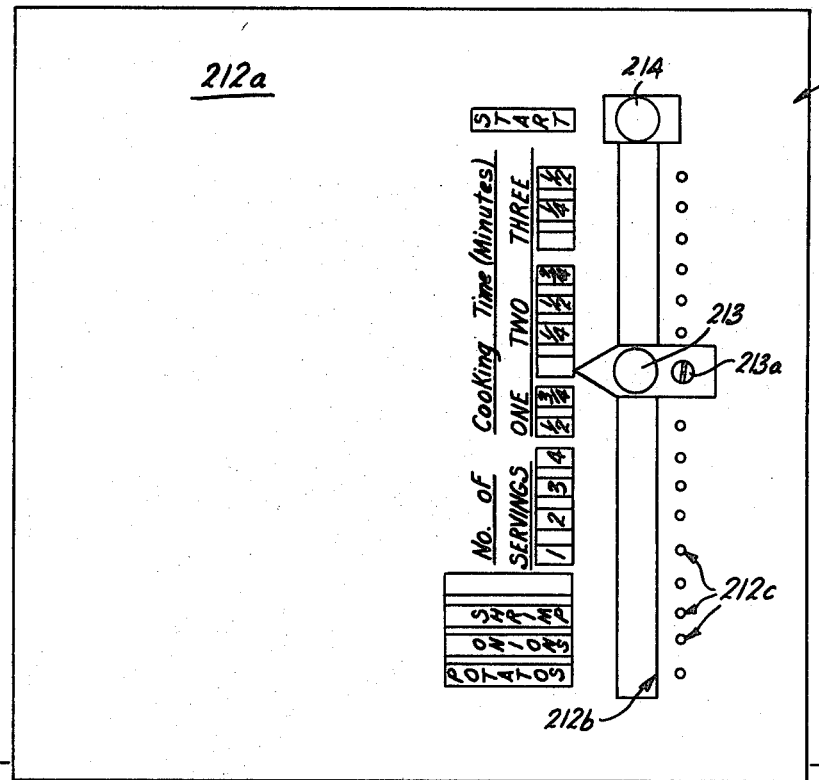
FIG. 3 is a top plan view of a key punch unit operable with the second embodiment of my invention showing the selection indicia and the key punch apparatus which is used for making selections and moving an associated punched tape.

Turning now more particularly to FIGS. 3–6, a conventional box-like housing 212 is used to contain the key punch apparatus which will now be discussed in more detail. The key punches are generally indicated by the numerals 213 and 214 in which 213 is being slidably mounted in the upper surface of the top panel 212a of housing 212. This slidable movement is provided for by the defining of an elongate rectangular slot 212b in the upper surface of housing top 212a and locating the key punch therein so that it may move within the slot (or from the top to the bottom thereof as shown in FIG. 3). plurality of indices are positioned immediately adjacent the elongated slot 212b and are used to define the type of food being served such as potatoes, onions, shrimp, etc.; the number of servings (one, two, three, and four); the time for the selected food in the cooking environment shown in minutes and fractions of minutes; and finally the start button is indicated at the uppermost indicia mark on the top panel 212a of the housing 212. Also, it should be pointed out that a plurality of detent recesses generally indicated by the numeral 212c is located on the opposite side of the elongate slot 212b and cooperates with a spring biased ball (not shown) which is located on the underside of screw 213a for the purpose of firmly, yet movably locating the key punch apparatus 213 at the proper position along slot 212b with respect to the selected indicia mark (the tape which is located directly below as will be discussed) thereby insuring that the key punch apparatus is properly positioned across the width of the tape for punching purposes.

Figure 4:
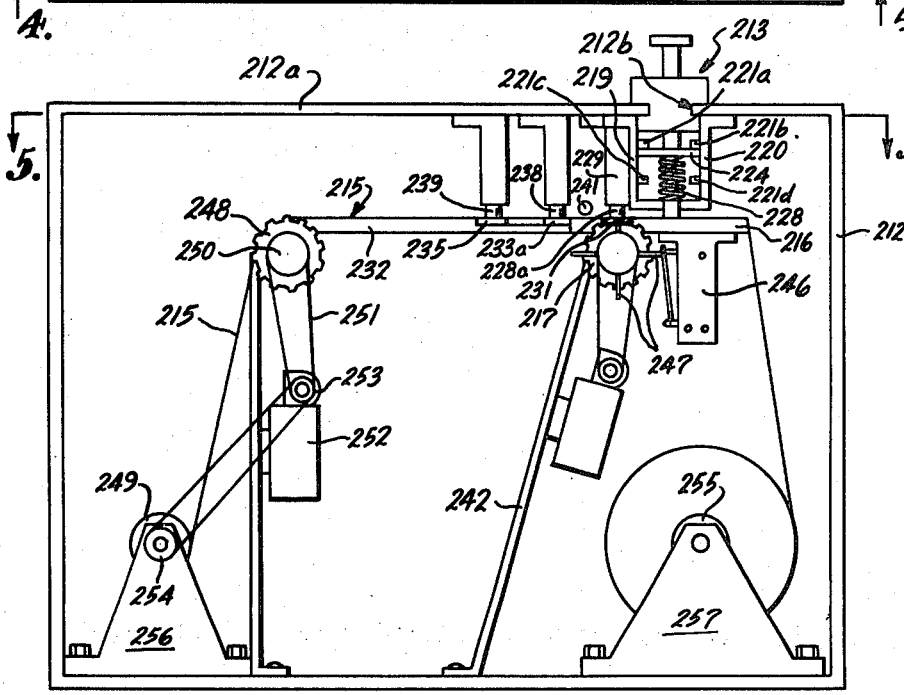
FIG. 4 is a sectional view of the key punch unit and readout apparatus taken generally along the line 4—4 of FIG. 3 in the direction of the arrows.
Figure 5:
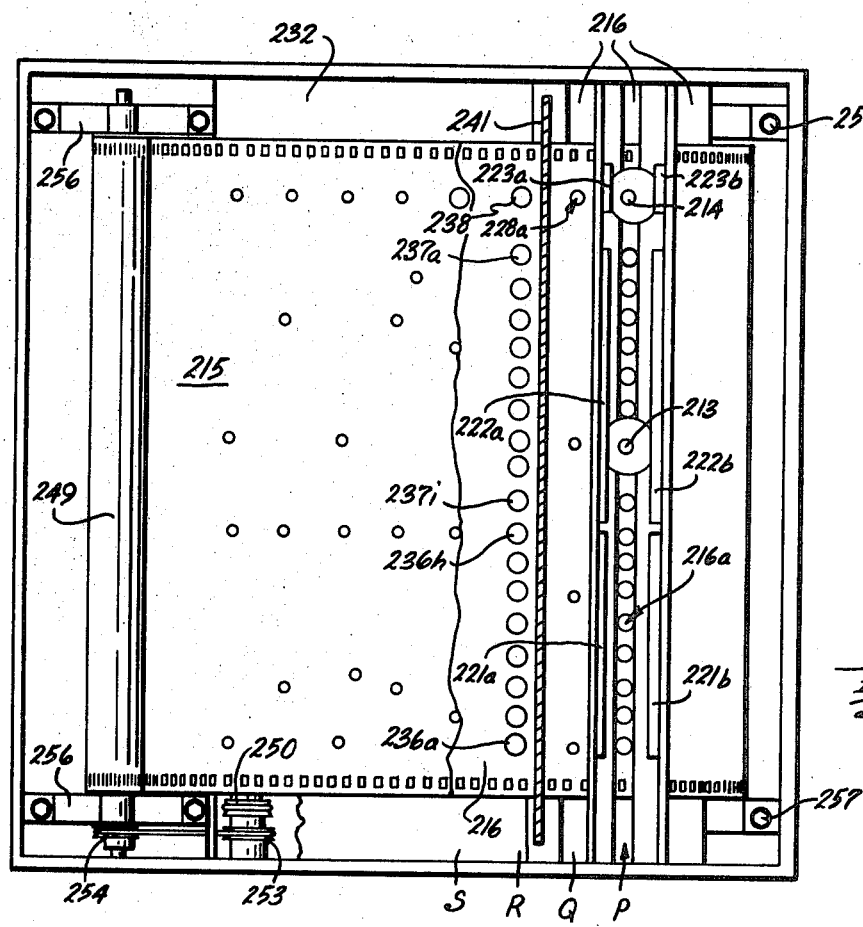
FIG. 5 is a sectional view of the upper portion of the key punch and readout taken generally along the line 5—5 of FIG. 4 in the direction of the arrows.

It is contemplated that a paper tape 215 with perforated edges is moved in equally spaced distances across the top of a perforated plate 216 by the rotation of sprocket 217 (see FIG. 4). As suggested above, key punch 213 is slidably moved within slot 212b, however, the underside of the top panel 212a includes a pair of channel brackets 219 and 220 which are affixed to opposite sides of the slot 212b adjacent a respective longitudinal edge thereof. These channel brackets have three sets of stops (there being two upper stops and two lower stops in each set) located across the long edges of slot 212b and are identified by the numerals 221a, b, c, and d; 222a, b, c, and d; and 223a, b, c, and d (see FIGS. 4 and 5). The stops 221 and 222 limit the vertical movement of key punch guide 224 for key punch 213, while stop 223 limits the guide 225 (of punch 214) in its vertical movement. It should be noted that the key punch 214 is stationary and it will control the primary movement of the tape.

Figure 6:
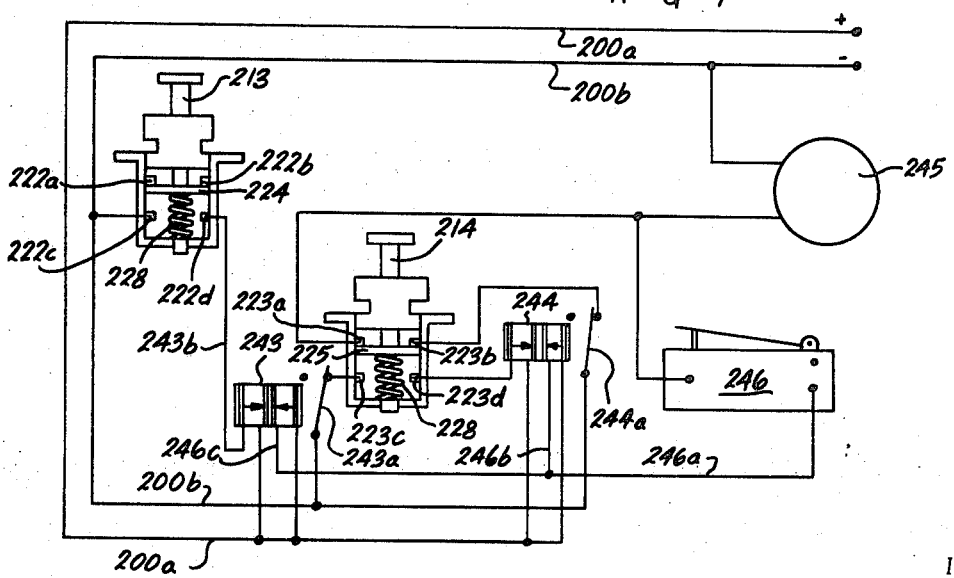
FIG. 6 is a schematic circuit diagram which shows the circuitry which monitors and moves the punched tape from a first position P to a second position Q in the key punch unit.

The key punch guide 224 (of punch 213) makes electrical contact between guide stops 222c and d when it is depressed and in the position shown in FIGS. 4 and 6. The key punches guide the associated stop and the channel brackets 219 and 220 are suitably insulated for protection in operating purposes to permit the associated electrical connection to be selectively made. A spring 228 in both key punches will return each punch to its upper position. As suggested above, the key punch 214 is identically constructed but is securely attached to channel brackets 219 and 220 and positioned to punch the outer or upper edge of tape 215 as shown in FIGS. 3, 4, and 6.

As suggested above, the base plate 216 has a plurality of holes 216a aligned tranversely to the direction of tape movement under the potential path of key punch 213 and a single hole under punch 214 to provide for the punching of holes in tape 215. There are several important areas relative to the surface of plate 216. For instance, the position P identifies the location where the tape is punched and the position Q (see FIG. 5) is the location of brush contact 228a which is held in insulated holder 229 (FIG. 4), same depending from the under surface of the top panel 212a. The brush contact 228a will align with a hole punched in tape 215 by key punch 214 as it moves in its forward direction so that when a punched tape is in the position Q, the brush contact 228a will make it electrically complete its circuit through the appropriate hole in the tape with a flat oppositely charged contact 231 (see FIG. 4) which is appropriately insulated from and fastened to the base plate 216.

A second base plate 232 having a stepped right-hand end portion (seen in FIG. 4) is fastened to the sides of the key punch unit 212 to support tape 215 and electrical strip contacts 233a and 233b, 234 and 235 at position R (see FIGS. 4 and 7). (Note that the end view of contact strip 233a is all that is visible in elevation in FIG. 4.) At position R, electrical impulses are conducted (if an appropriate hole appears in tape 215) to control circuits through brush contacts identified by the numerals 236a–236h, 237a–237i and 238. (The 236, 237 and 238 contacts are spaced across the upper surface of the tape 215 to properly read the various parameters.) These contacts are used to respectively activate apparatus corresponding to food selection (the type of food), the number of servings, and the exposure time. As with contact 228a, electrical brush contacts and related holders are fastened to the underside of the top panel 212a and both the strip contacts and the brush contacts are suitably insulated from the base plate and top panel. Finally, these brush contacts are positioned to align with the punched holes of the tape on its forward movement. Also, an electrical brush contact 239 is located at position S to contact an oppositely charged plate 235 through a hole in tape 215.

The positions P, Q, R and S are equally spaced so that the brush terminals 228a, 238 and 239 serve to monitor and control the movement of tape 215. As shown in FIG. 4, there is a space between base plates 216 and 232 wherein a plastic rod 241 is located relative to the upper surface of the tape 215 as it moves across the base plates. This rod functions to depress the tape down along the dividing wall 242 when orders are punched in the tape and the tape is moved from right to left at a pace that is faster than the cooking environment can accommodate the processing of the food. As a result, the tape will freely festoon along the dividing wall until it is moved therefrom by the sprocket arrangement which will be discussed in more detail.

Turning now to the operation of the key punch device and more particularly to FIG. 6, when the operator selects the food, the number of servings and the time of cooking exposure by sliding the key punch 213 to the indicated positions and depressing the key punch to punch the holes in the tape. The key punch 214 is then depressed which causes the punched tape to move from position P to position Q. This movement is accomplished by the circuitry shown in FIG. 6 which indicates that the depressing of key punch 213 will cause guide 224 to span stops 222c and 222d to energize the left coil of the single pole single throw latching relay 243 via the negative line 200b, the above-mentioned stops, line 243b, relay 243 and positive line 200a. This moves armature 243a to energize the lower stop 223c of punch 214. As a result, when key punch 214 is depressed and guide 225 spans stops 223c and 223d, the left coil of single pole single throw latching relay 244 will be energized to move its armature 244a to the right-hand contact thereof to energize stop 223b so that a complete circuit to motor 245 is effected through stop 223a when the guide 225 is spring returned to its upper position. The motor 245 will be stopped when the tap has advanced to the position Q by microswitch 246 which closes when sprocket 217 has completed a quarter turn and a quadrant projection 247 (which is affixed to sprocket 217) depress the microswitch 246 contact. The circuit is then completed from the microswitch 246 to energize both of the right coils of the single pole single throw latching relays 244 and 243 (via lines 246a, 246b; 246a and 246c, respectively) thereby moving their respective armatures to the left contacts and stopping motor 245.

The punched tape is moved by sprocket 248 to a roller 249. The sprocket 248 (which engages the perforated edges of tape 215) is rotated by pulley 250, belt 251 and the gear reduction motor generally indicated by the numeral 252. A pulley 253 drives pulley 254 to take up slack in the tape roller 249. This pulley 254 is arranged with slippage to hold tension to tape 215. The tape rollers 255 and 249 are supported by a pair of conventional brackets 257 and 256, respectively.

Turning now more particularly to the circuitry shown in FIG. 7, it should be noted that it contains substantially the same elements as that shown and described with respect to FIG. 2. There is, however, a substantial difference in the energization of contacts 203a–203i in that the selective location of punched holes in tape 215 permit the contacts 237a–237i to be energized as same moves with respect to the electrical base strip 234.

In operation, the carrier in position B at the cooking environment closes microswitch 37 which energizes the armature 210a of the single pole single throw read switch 210 thus energizing the right coil of double pole double throw latching relay 209. As previously described, this causes the reversible gear reduction motor 200 with the associated lever arm 201 (riding on rotatable shaft 60) to rotate until the brush contact 202 spans an energized contact in the 203 group. Current will then flow through the contact in the arcuate strip 204 to the coil of single pole single throw read switch 210. This shifts armature 210a to the left contact and switches the current flow from microswitch 37 to relays 64 and 103 for monitoring as to time and space conditions of the cooking environment as described in my copending patent application now issued U. S. Pat. No. 3,505,072. At the same time, the left coil of relay 209 is energized shifting the armatures 209a and 209b to the right contact thereof and stopping motor 200.

When the time and space conditions in the cooking environment (monitored by the circuitry in FIGS. 17a and 17b of my copending application now issued U.S. Pat. No. 3,505,072 have been complied with, the terminal 61a will be energized to excite the right coil of double pole double throw latching relay 211 via line 211c thereby moving armatures 211a and 211b to the left contact and switching the motor terminal of motor 200 for reverse rotations so that lever arm 201 is returned to its starting position at contact 205. At this time, brush contact 202 will span the contacts 205 and 206 and complete the circuit to the left coil of a double pole double throw latching relay 211 moving the armatures 211a and 211b back to their right contacts and stops motor 200. This action also places the circuit in the condition to accept the next selection and the exposure time setting.

The brush contacts 228a, 238 and 239 are also shown in FIG. 7 and are physically positioned so as to align with particular portions of the punched tape as tape 215 is moved forward. When the tape, punched at position P, is moved to position Q by the action of sprocket 217 and the circuitry generally described relative to FIG. 6, the brush contact 228a is energized when a punched hole in the tape permits the current flow from the oppositely energized contact 231 (at position Q). This contact is designed to move the punched holes of the tape into the position R where it will be processed in appropriate circumstances. The current flow from brush contact 228a will energize the left coil of single pole single throw latching relay 258 via lines 258c and 200b. This action maintains armature 258a against the right-hand contact thereof (FIG. 7) and allows current to flow to the armature 259a of read switch 259 through motor 260. The position of armature 259a is to normally close the circuit with motor 260 so that same is energized upon the movement of armature 258a.

When brush contact 238 is energized indicating that a hole in punch tape 215 has been moved to the position R, the coil of read switch 259 will be excited via lines 259b, 259c and 200a so that the armature 259a is moved against the left contact thereby interrupting the current flow to motor 260 and stopping same. As a result, any current flow from contact 228a will cause tape 215 to move forward only if there is no punched hole in tape 215 occupying the position R. This permits all of the electrically functioning, scanning and reading (of the particular row occupying that portion of punch tape 215) to be accomplished before a next row is moved to the R position.

Contact 238 will also stop the movement of tape 215 when the punched holes reach the position R. After the tape has been read at position R and the time has been set on time setting wheel 54, the tape is moved forward by the current flow from conductor 61a which energizes the right coil of double pole double throw latching relay 261 via line 261b thereby shifting its armature 261a to the left contact and energizing motor 26.

When the punched tape advances to permit the brush contact 239 to be energized (also from plate 235), the resultant current flow to the left coil of relay 261 via line 239a moves the armature (261a) to the right contact, thereby stopping motor 260 and tape 215. Since the physical space between P, Q, R and S are equal, the next punched hole row will be in position R. The brush contact 239, also permits current flow to the right coil of relay 258 thereby positioning all relay for continuing operation.

The section of the key punch contacts 236a–236h is designated for the selection of food items and the number of servings. For example, the selection of onions will energize brush contact 236b which directs a current flow to the left coil of double pole double throw latching relay 266 (see FIG. 8). This moves the associated armatures 266a and 266b to their respective right contacts and energizes one side of the conveyor motors generally indicated by the numerals 277, 278, 279 and 280. At the same time the movement of armatures 266a and 266b disconnects the flow of energy (through a line designated at the upper left-end portion of FIG. 8 by the numeral 262) to the plate contact 233a thereby preventing the energization of any other motor bank until this particular order has been processed.

The selection of two servings will energize brush contact 236f (FIG. 7) and complete the circuit to the right coil of double pole double throw latching relay 271 (FIG. 8) thereby shifting its armatures 271a and 271b to its left contact and resulting in the energizing of the other side of motor 278 in the onion section so that a conveyor that has been stocked with two servings of onions will be moved to a cross conveyor.

The movement of armature 271a of relay 271 disconnects energy through a line generally indicated by the numeral 263 located in the right-hand portion of FIG. 8 so that current flow is interrupted to contact plate 233b thereby preventing another selection in this group until the above-mentioned order has been processed. It is contemplated that 16 separate conveyors may be stocked with previously filled carriers to provide the selection of food and servings designated. Such a system is partially shown in FIG. 10, wherein carriers (26) may be via conveyor C1, C2, C3, or C4 conveyed toward a cross conveyor (cc) which delivers same to the cooking environment. At the point where the carrier is transferred, a bracket 289 which supports microswitch 290 is closed when the rear hook 291 of carrier 26 lifts the closing arm of the microswitch. The closing of microswitch 290 energizes the right coil of each of the relays 265, 266, 267 and 268 and the left coil of relay 269, 270, 271 and 272 which shifts off relay armatures into a position to accept the next order.

Accordingly, it is seen that a plurality of different types of foods may be selected from a push button input with a permanent record made of the type of food, the number of servings, and the time for cooking each article. This results in automatic handling of the food as well as a substantial aid in accounting procedures and record keeping summaries to accurately predict orders and pick times of business activity. As suggested above, the particular circuitry associated with the key punch may be conveniently utilized in vending machine and/or food processing type apparatus and when combined with the disclosure material of my copending application makes optimum use of the cooking or food processing environment all at the same item automatically handling and dispensing food that has been cooked to order and selected at a location remote from the cooking environment.

Turning now to the embodiments of my invention shown in FIGS. 11 through 17, it should be recalled that the key punch with its associated contacts 236a–236h are utilizable for the selection of food items and the number of servings as discussed with reference to FIG. 8. In order to further accommodate the selections, a plurality (16 are used with the present embodiment) of separate structures will be constructed to support and hold for processing, a preselected type and quantity of food.

To facilitate the eventual use and automatic handling of selected food quantities, holders 300 (see FIG. 11) are utilized. The holders comprise at least four angle irons, generally designated by the numeral 301, which are spaced apart and secured at the top portion thereof by an H frame 302 and by spacers 303 along selected side portions of the angles. H frame 302 has a bracket mounting 304 weldedly connected to its upper central portion with a roller wheel 305 mounted between the spaced apart legs thereof which is similar in nature to that of a conventional pulley, this enables the entire holder to be hung on rod 306 and easily moved along the length thereof via the roller wheel arrangement (note the plurality of holders 300 supported on their various rods 306 in FIG. 14). Finally, as shown in FIG. 11, selected opposing sides of each of the angle irons 301 are notched at 301a to permit a plate 307 (see FIG. 13) to be slidably placed therein.

The above-mentioned holders are designed to accept and retain a plurality of containers 308 (see FIG. 12). These containers are cube shaped having one open face. It is contemplated that the containers will be loaded within holder 300 by stacking same so that the top of each container serves as the bottom of the next container directly above.

It will be seen that the holders 300 may be removed from their movable interconnection with rod 306 and inverted for loading. In other words, preselected food quantities and types of food will be located in each container with the corresponding holder inverted so that the first container loaded in the holder will be the last one dispensed therefrom. When all of the containers are stacked within a particular holder, the plate 307 is inserted within notches 301a to permit the holding of the contents of the lowermost container therein when the holder is once again rotated 180° and returned to the rod support 306. In this position the containers are initially precluded from falling out of the heretofore opened end of holder 300 by plate 307a and the contents of same may be dispensed in seriatim by removing first the plate and then the emptied container immediately below one still having its contents therein.

As shown in FIG. 14, once a holder with its containers is righted and hung by its associated roller wheel 305 on rod 306, then an individual row of holders will relate only to a particular type of food with each container having a preselected quantity of the specified food therein. It is contemplated that in vending machine operations and other remote food processing operations, a plurality of rods (thereby forming a plurality of rows of holders) with a preselected number of holders on each rod will be stored for dispensing purposes.

The weight of the roller mounted holders on their respective rods is such (the rods are inclined slightly upwardly from left to right) that the forwardmost holder having one or more containers therein will be located in position A (see FIG. 15). At position A, each row of roller mounted holders comes in contact with a brace 309 which is fixedly connected to and held in a substantially vertical plane by the flanged brackets 309a. In actual practice these brackets may be fixedly attached to a side wall W (FIG. 15) of the particular vending apparatus.

Each holder, a described with reference to FIG. 11, has a substantially opened side (there being no spacers 303) between the two angles having the slot 301a therein. Accordingly, the above-mentioned braces 309 contact only the containers within a respective holder thereby permitting an empty holder to roll down inclined rod 305 past its respective brace 309 and to be stored in the forwardmost or left-hand position of the vending machine shown in FIG. 15. Accordingly, once a holder has been emptied, its associated brace will then contact the next holder having at least one container therein and will cause same to remain in position A until it has been emptied in accordance with the circuitry which will be described.

As shown in FIG. 15, each rod 305 has an angled bend at 305a which lowers a particular holder 300 to the position A. Since all of the above-mentioned holders are of equal size, the lower portion of same containing the notches 301a, supports plate 307 therein and is to be aligned with a substantially horizontal storage chamber. This storage chamber is diagrammatically represented by the upper surface of the rack generally indicated by the numeral 310. As will be seen, a solenoid (317) is associated with each row of holders. Each solenoid has a pusher head (319) which will contact the depending lip 307a of plate 307 and push same onto the storage chamber 310. Furthermore, the pusher head is withdrawn by the conventional return spring after energization. The contents of the container is allowed to be dispensed through the head therefrom into a carrier with the pusher head extended as will be described. The empty container (holding the containers above it) will be automatically positioned for movement out from the stored position upon subsequent action of the above-mentioned solenoid and pusher structure.

A carrier, generally indicated by the numeral 311, is large enough at its open upper end to span at least four aligned containers (same being supported within their respective holders 300 in a horizontal plane above the upper open end of the carrier) is suspended by carrier bracket 312 from carrier rod 313 shown in FIGS. 14 and 15. The carrier rod 313 is fixedly attached at each end portion thereof to a bicycle-type roller chain 314. In actual practice, there will be two such chains movable in substantially the same planes which are rotated by motor 315 and appropriately geared through the sprocket arrangements schematically indicated by the numeral 316. It will be seen that carrier 311 may be moved to the above-mentioned position A (or away therefrom to position B) by energizing motor 315 which causes the chains 314 to rotate (carrying the carrier rod and carrier therewith) until motor 315 has been shut off due to a control mechanism which will be discussed later. Therefore, the carrier 311 picks up food quantities from the containers at position A and deposits same in carriers 26a of a slightly different design (than 311) in position B.

Turning now to a detailed discussion of the construction of carriers 311 and 26a, the carrier (311) suspended from bracket 312 has a hinged bottom 311a which is hinged at the forward wall (see number 311b) and which is hinged at the plate and weight combination 311c extending outwardly therefrom. The weighted plate 311c is selected so that the food quantities alone in the carrier will not hingedly move bottom 311a and permit same to inadvertently spill out. As will be seen, a solenoid (340) is located to contact the under side of weighted plate 311c and to open the bottom 311a at a preselected location (position B).

At position B, carrier 26a is located to receive the contents of carrier 311. Carrier 26a is similarly constructed to carrier 26 disclosed in my copending application except that bottom 26b is hinged at 26c at the center portion thereof and includes the weighted plate 26d having the same function as weighted plate 311c described above. One side (26e) of carrier 26a is sloped to direct the food quantity therein to an optimum dispensing position.

As suggested above, each one of the holders 300 will have a solenoid, generally indicated by the numeral 317 and supported by bracket 321 in the dispensing location (position A). Each solenoid will include the extendable armature 318 and the pusher head 319. It is contemplated that the pusher head will be comprised of two thin flat plates 319a and 319b fixedly attached to the outer end portion of each armature 318. These plates are vertically oriented and spaced apart to permit food quantities to easily fall therebetween. The vertical outer end portion of each plate will contact and engage first the lip 307a of plate 307 for the purpose of pushing same out of holder 300 and later the forward surface of a container 308. The upper horizontal portion of each plate is designed to support a container 308 thereon but still allow the content therein to fall unimpeded therethrough with the horizontal plate 307 pushed out of the way. As will be shown, the above-mentioned energizing of any one of the solenoids 317 and the corresponding movement of the associated pusher head 319 with respect to the plate 307 and/or to an emptied container 308 operates in such a manner that the spring return of pusher head 319 to the position shown in FIG. 15 permits an emptied container (the contents of same having been dispensed into carrier 311) to drop on the ledges 320 of a corresponding storage chamber (generally indicated by the numeral 320a) for the emptied containers. In actual practice, the ledges 320a may have a "step down" immediately to the right of the dispensing area or the ledges may be angled downwardly therefrom. In any event, the upper edge of the container when on chamber 320a is slightly below the lower surface of the storage area 310 for plates 307. As a result, the pusher head 319 will not have its reciprocating movement interfered with. Conversely, the vertical dimension of the outer surface of the pusher head 319 is such that it is permitted to contact only the lower edge portion of lip 307a well below the upper edge of an emptied container.

The emptied container is permitted to stay in the dispensing area above position A so that the contents of the container immediately above same are held therewithin until a further selection of a specific type and quantity of food has been made thereby energizing the corresponding solenoid 317 and pusher head 319 to move the emptied container out of the way into storage area 320a. These emptied containers may be conveyed away or allowed to remain in the storage area. Upon the making of a further selection, the now selected contents of the appropriate container is permitted to drop into carrier 311. This action will continue until the containers being supported within a particular holder 300 have been completely emptied therefrom. At this time, the weight of the holder will result in it being moved to the storage location on the left-hand portion of rod 305 as shown in FIG. 15. The next holder having containers therein will then contact the brace 309 and be held in position A for further action on the associated plate and/or containers by the solenoid pusher head 319.

Turning now more particularly to the circuit operation, FIG. 17 is utilized to operate in conjunction with the key punch contacts 236a–236h which correspond to the selection of food items and the number of servings. For example, if a selection of shrimp is made on the key punch apparatus, the brush contact 236b will be energized so that current may flow to the left coil of a single pole double throw latching relay 325. The exciting of the left coil thereof (via line 326b, the coil and the brush contact 236b) moves the associated armature 325a to its right contact and applies a negative potential to one side of the group of four solenoids generally indicated by the numerals 317e, f, g, and h via the line 326a, the armatures of any one of the quantity relays 331–334, line 326a', line 336a', armature 326a, line 327 which will include the armature of the item relays including relay 325 and finally line 325b to the left-hand portion of the above-mentioned solenoids. With armature 325a contacting its associated right contact, the circuit is also completed to the right-hand coil of relay 328, line 328b (now having negative potential thereon), and line 328c to the positive line 326b. This excitation of the right-hand coil of relay 328 causes its associated armature 328a to move to its left contact thereby completing the circuit to motor 315 via lines 315a (which interconnects with the negative line 326a) and line 315b (which interconnects with the positive line 326b through a later discussed relay armature 330a). Accordingly, with motor 315 energized, carrier 311 is moved under the appropriate holders 300 in position A having containers with shrimp therein. At the same time, the movement of armature 325a to its right contact puts the above-mentioned negative bias on the left-hand terminal of the microswitch 329 and results in a disconnecting or opening of the circuit to the plate contact 233a (via the above-mentioned line 327) thereby preventing any further energization of any other motor bank until this particular order has been processed.

When carrier 311 reaches the group of containers with shrimp located therein, the carrier rod 313 will contact the closing arm 329a of microswitch 329 thereby closing the switch and applying the negative potential through the microswitch and via line 329b to the left coil of relay 330. This results in the excitation of the left coil of the single pole single throw latching relay 330 since the positive line 328c is hard wired into both coils and to the armature 330a of relay 330. With the left coil being energized, armature 330a is moved to its right-hand contact thereby disconnecting the positive line to motor 315 and open circuiting same to stop carrier 311 in the shrimp section. At the same time, armature 330a puts the positive voltage on each each left armature (331a–334a) associated with the four double pole double throw latching relays 331, 332, 333, and 334 respectively, via line 330b. Accordingly, the carrier 311 will be in position to receive the food item and needs only for the operator to select the quantity (number of servings) to initiate the final action.

The selection of two servings by the operator will energize brush contact 236f (FIG. 17) and complete the circuit to the right coil of the double pole double throw latching relay 333 thereby causing its armatures 333a and 333b to move to the left-hand contacts thereof which correspondingly results in the energizing of solenoid 317f in the shrimp section. (Note that the left terminal of relay 333 is interconnected with the positive line via armature 333a, line 330b, armature 330a, and line 328c.) As discussed, the left-hand terminal of the solenoid 317f interconnects with the now negative line 327 via line 325b and armature 325a. As a result, the armature 318 of solenoid 317f extends and either moves plate 307 or an empty container 308 out of the way so that a filled container, stocked with two servings of shrimp, will deposit its contents into carrier 311 in a manner described above.

With relay 328 having its armature 328a moved to the left contact by the negative voltage on line 328b, the constant energization of the right-hand coil is removed by utilizing the latching relay 336. Relay 336 latches its armature 336a to its right contact until after carrier 311 is in position A and microswitch 329 has energized the right-hand coil thereof. At this time, the armature 336a is moved and latched to its left contact. In actual practice, the single pole latching relay 336 will have its right-hand coil energized through the delay network comprised of the resistor-capacitor combination of R1–C1 when microswitch 329 is closed via line 329b (now having a negative potential thereon), line 336b, the coil, and line 328d to the positive lines 328c and 326b. Accordingly, the solenoid 317f is given time to react relative to the particular plate 307 or food containers 308 before the motor 315 will be started again to move the carrier 311 to position B. This causes relay 330 to shift its armature 330a back again to its left contact to start motor 315 so that carrier 311 will move from its loading position A to an unloading position B where it deposits its contents in carrier 26a for cooking.

A double pole double throw microswitch 337 is located at position B and will be closed when the carrier rod 313, moving carrier 311, contacts the closing arm 337a (located at position B). This action results in a completing of the circuit to the left coil of the single pole double throw latching relay 328 (via lines 337b and 328c) and then the shifting of its armature 328a to the right contact thereof so that current flow to motor 315 is disconnected and the motor stopped.

The carrier 311 is now ready to discharge its contents into carrier 26a, however, it is necessary to determine that the carrier 26a is in position to receive the food for cooking purposes. This is monitored by the single pole single throw normally closed relay 338 which is energized by the positive voltage on line 94a (see FIG. 17a of my copending application) and line 326a which signifies that the conveyor with carrier 26a affixed thereto is not in motion. Further, the cooking spaces in the cooking environment may be occupied so as to permit reversing an empty carrier to pick up the next order (in instances of automatic operation when a carrier 26 may be attached to each carrier rod). The monitoring for this situation is accomplished by single pole single throw normally closed relay 339 which interrupts the current flow to the unloading solenoid 340 when the right contact of relay 103 is energized (see page 40 and FIG. 17b of my copending patent application).

When an empty carrier 26a has been reversed to position B, the contents of carrier 311 will be discharged into the reversed carrier 26a after the reversing action has been completed. This will be indicated when microswitch 50 (see FIG. 17b of my copending application) is energized. It then energizes solenoid 340. Solenoid 340 projects its associated armature 340a to contact the under side of and lift the weighted plate 311c to thereby open the hinged bottom of carrier 311. As a result, the contents are emptied into carrier 26a. The completion of the circuit to solenoid 340 also energizes the right coil of single pole double throw latching relay 341 (through the time delay R2 and C2) which via line 326c returns the armatures of all the relays for food (types) and quantity selection to a position for the next selection.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Apparatus for controlling the cooking of foods, said apparatus comprising:
   A. A food cooking means for cooking food exposed to a cooking environment thereof;
   B. Means for moving food into the cooking environment of said cooking means for a preselected time period, said moving means operable to move said food out of said environment after said time period;
   C. Timer means for controlling said food moving means; and
   D. Means for actuating said timer means from a remote location thereby controlling the time that food is exposed to said cooking environment, said timer means and said moving means cooperating to permit a plurality of food quantities to be automatically moved into said cooking environment and maintained therein for a cooking time corresponding to that initiated by said remote actuating means, said remote actuating means including a data storage means for accumulating data relative to said plurality of food quantities, said actuating means being interconnected with said data storage means through appropriately punched tape and operable to condition said timer means for operation in accordance with said accumulated data.

2. The combination of claim 1 wherein said data storage means includes a key punch apparatus capable of producing said appropriately punched tape; and wherein there are means operated from said punched tape for automatically controlling the type of food delivered to said cooking environment and the number of servings to be cooked.

3. The invention as in claim 1 wherein sad actuating means includes a plurality of separate electrical contacts, said electrical contacts having a preselected timing period associated therewith, a motor means, said motor means operable to rotate a movable contact arm relative to said electrical contacts, means for selectively energizing said motor means to move said movable contact arm to preselected electrical contacts thereby actuating said timer means for the time period associated with said contacts in electrical contact with said movable contact arm.

4. The apparatus of claim 1 wherein the means for moving food into the cooking environment is a single line conveyor.

5. In a device for cooking foods having a cooking environment and a means for moving said food into said environment, the improvement comprising:
   a holder,
   a plurality of food containers operable to hold preselected quantities of different foods therein, said holder operable to hold said containers, each container having at least one opened side and one closed side, said containers positioned within said holder so that the closed side of one container closes the opened side of another container, a plate to close the open side of the bottom container and
   means for selectably removing a container from said holder in order to remove food from one of the containers.

6. The combination as in claim 5 including a plurality of said holders, and
   means for remotely controlling the selective removal of a container from any one of said holders.

7. The invention as in claim 6 wherein said cooking environment has space for simultaneously cooking a plurality of food quantities,
   means for monitoring the space in said cooking environment,
   a food moving means, and
   means for controlling the food moving means to effect the movement of said selectively removed food relative to said cooking environment in accordance with said monitoring means.

* * * * *